US012625704B2

(12) United States Patent
Hrusecky et al.

(10) Patent No.: US 12,625,704 B2
(45) Date of Patent: May 12, 2026

(54) LOW POWER LATE-SELECTED CACHES USING A SET-PREDICTION HISTORY

(71) Applicant: INTERNATIONAL BUSINESS MACHINES CORPORATION, Armonk, NY (US)

(72) Inventors: David A. Hrusecky, Cedar Park, TX (US); Wolfgang Penth, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 18/648,835

(22) Filed: Apr. 29, 2024

(65) Prior Publication Data

US 2025/0335198 A1      Oct. 30, 2025

(51) Int. Cl.
    *G06F 9/38*       (2018.01)
    *G06F 9/30*       (2018.01)
    *G06F 11/14*     (2026.01)

(52) U.S. Cl.
    CPC ........ *G06F 9/30047* (2013.01); *G06F 9/3806* (2013.01); *G06F 11/1407* (2013.01)

(58) Field of Classification Search
    CPC . G06F 9/30047; G06F 9/3806; G06F 11/1407
    USPC ........................................................ 711/118
    See application file for complete search history.

(56) References Cited

U.S. PATENT DOCUMENTS

| | | | | |
|---|---|---|---|---|
| 5,418,922 A | * | 5/1995 | Liu | ..................... G06F 12/0864 |
| | | | | 711/E12.063 |
| 6,356,990 B1 | | 3/2002 | Aoki | |
| 6,418,525 B1 | * | 7/2002 | Charney | ............... G06F 9/3806 |
| | | | | 711/204 |
| 7,475,192 B2 | | 1/2009 | Correale, Jr. | |
| 10,042,770 B2 | | 8/2018 | Chadha | |
| 10,157,137 B1 | * | 12/2018 | Jain | ..................... G06F 12/0864 |
| 11,281,586 B2 | | 3/2022 | Liu | |

(Continued)

OTHER PUBLICATIONS

IP.com No. IPCOM000196384D, Management of Dynamically Resizable Data Processing Units based on Application State Predictive Estimation, IP.com Electronic Publication Date: Jun. 2, 2010, 6 pages.

(Continued)

*Primary Examiner* — Jared I Rutz
*Assistant Examiner* — Wei Ma
(74) *Attorney, Agent, or Firm* — CANTOR COLBURN LLP; Edward Wixted

(57) ABSTRACT

A method, computer program product, and computer system for reading data stored in a set associative cache. A cache read instruction that did not read the cache after being previously launched is relaunched after an effective address (EA) of the instruction was ascertained. A hash of the ascertained EA (EAHash) and a class congruence class (CCC) is determined from the ascertained EA. A search is performed for a match of the EAHash and CCC of the ascertained EA to the EAHash and CCC, respectively, of an instruction whose EAHash, CCC, and set are stored in an instruction history stream. If the match is found, only read enables associated with the stored set of the match, which is a read enable of only one class of one address group in the cache, are activated. If the match is not found, all read enables of the one address group are activated.

20 Claims, 6 Drawing Sheets

(56)                References Cited

U.S. PATENT DOCUMENTS

| 2009/0094435 | A1* | 4/2009 | Lu | G06F 12/0862 |
| | | | | 711/216 |
| 2013/0262777 | A1* | 10/2013 | Ghai | G06F 12/0897 |
| | | | | 711/E12.071 |
| 2014/0181407 | A1* | 6/2014 | Crum | G06F 1/3275 |
| | | | | 711/128 |
| 2015/0234664 | A1* | 8/2015 | Kim | G06F 9/3838 |
| | | | | 712/216 |
| 2017/0286119 | A1* | 10/2017 | Al Sheikh | G06F 9/3832 |
| 2021/0240631 | A1* | 8/2021 | Joo | G06F 12/0811 |
| 2023/0063976 | A1* | 3/2023 | Fernsler | G06F 9/30043 |

OTHER PUBLICATIONS

IP.com No. IPCOM000216961D, System and Method for Recovering Global Branch Prediction Information Using Address Offset Information, IP.com Electronic Publication Date: Apr. 25, 2012, 5 pages.

IP.com No. IPCOM000263479D, Value Prediction Implementation, IP.com Electronic Publication Date: Sep. 3, 2020, 5 pages.

Jalili, M. et al., Reducing Load Latency with Cache Level Prediction, arXiv:2103.14808v1 [cs.AR] Mar. 27, 2021, 12 pages.

Nicolaescu, D. et al., Reducing Data Cache Energy Consumption via Cached Load/Store Queue, ISLPED'03, Aug. 25-27, 2003, Seoul, Korea; Copyright 2003 ACM 1-58113-682-X/03/0008, 6 pages.

Wang, L. et al., Way Prediction Set-Associative Data Cache for Low Power Digital Signal Processors, he Key Laboratory of Information Technology for Autonomous Underwater Vehicles, Chinese Academy of Sciences Institute of Acoustics, Chinese Academy of Science, Beijing, China, 2020, 5 pages.

* cited by examiner

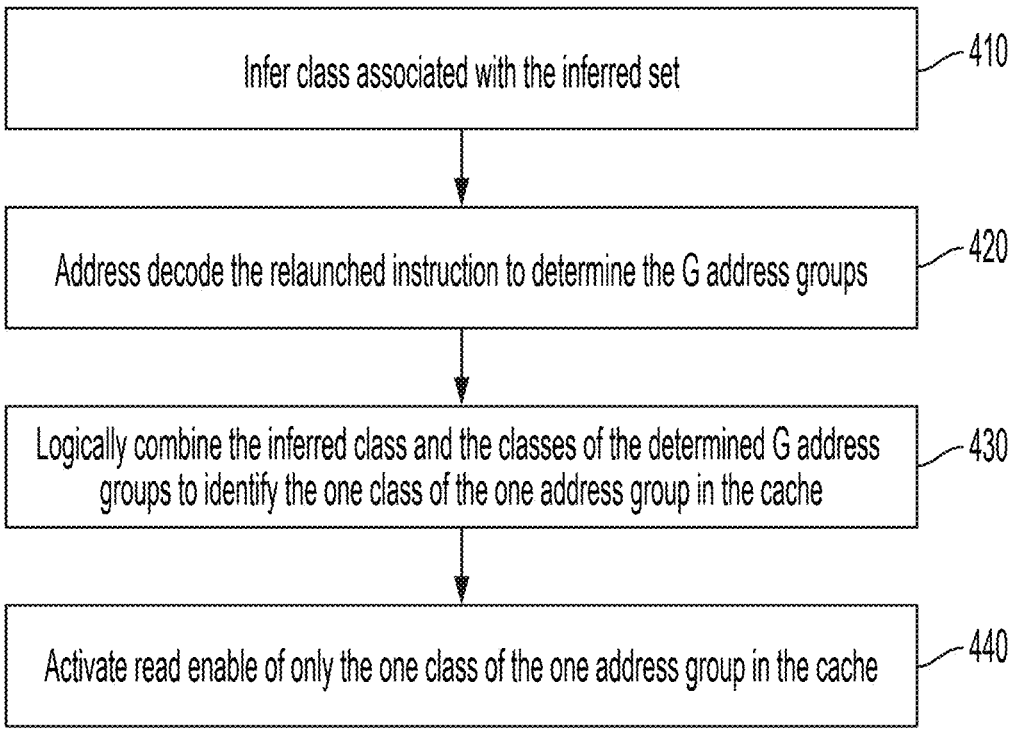

Infer class associated with the inferred set — 410

Address decode the relaunched instruction to determine the G address groups — 420

Logically combine the inferred class and the classes of the determined G address groups to identify the one class of the one address group in the cache — 430

Activate read enable of only the one class of the one address group in the cache — 440

FIG. 4

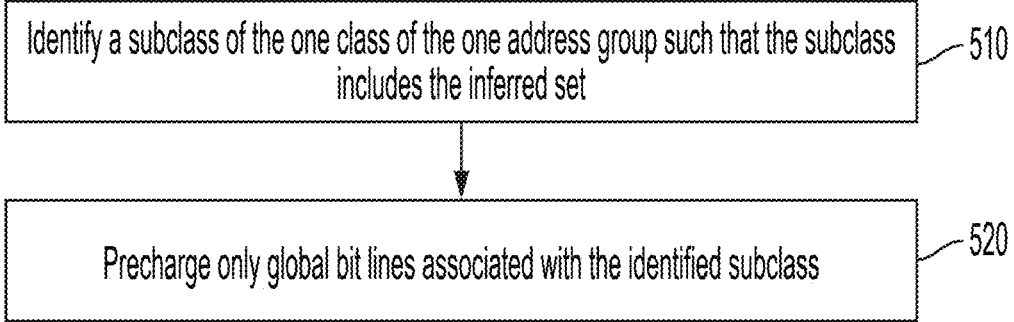

Identify a subclass of the one class of the one address group such that the subclass includes the inferred set — 510

Precharge only global bit lines associated with the identified subclass — 520

FIG. 5

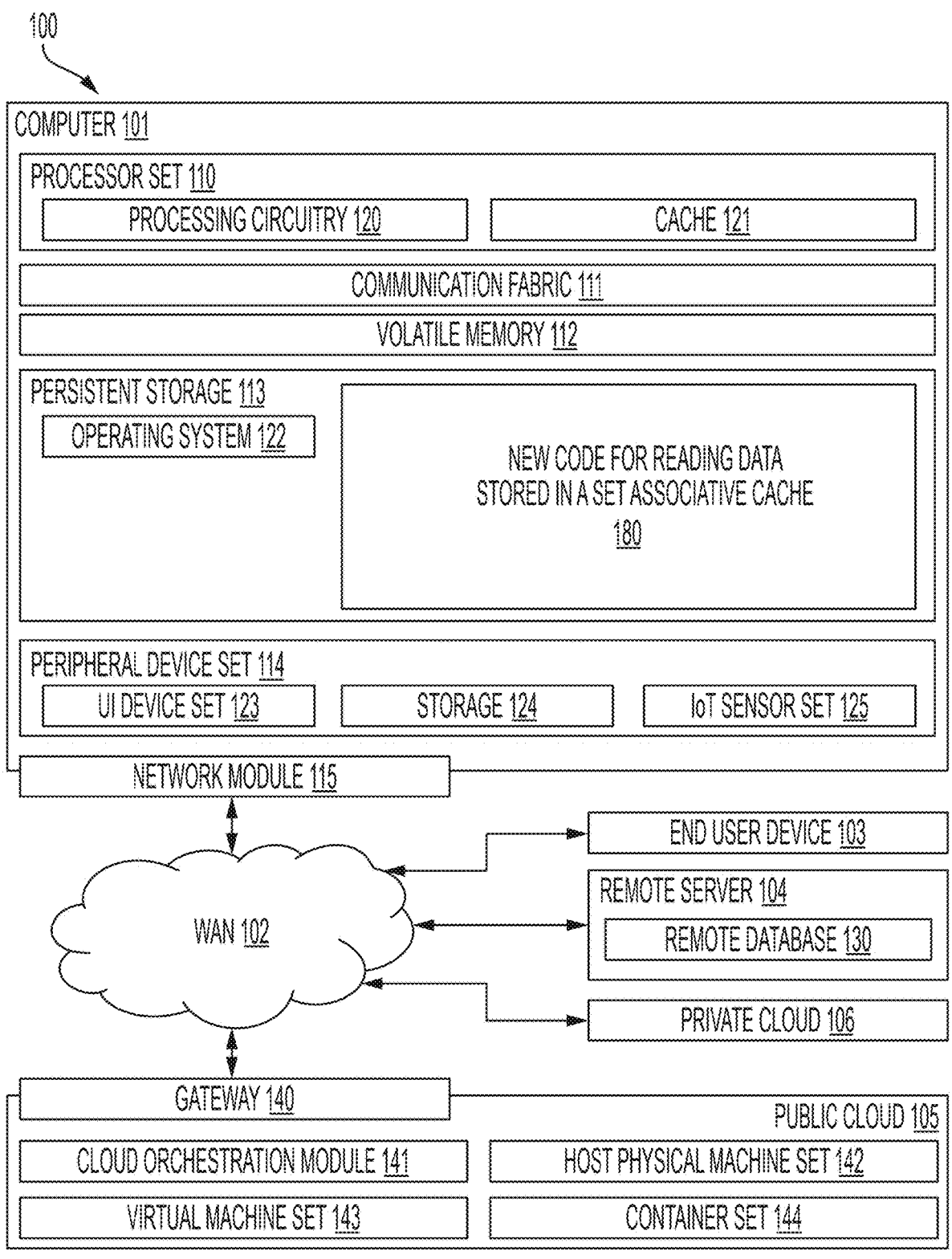

100

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

NEW CODE FOR READING DATA STORED IN A SET ASSOCIATIVE CACHE 180

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 7

LOW POWER LATE-SELECTED CACHES USING A SET-PREDICTION HISTORY

BACKGROUND

The present invention relates generally to reading data stored in a cache, and more specifically, to reading data stored in a set associative cache using an instruction history stream.

SUMMARY

Embodiments of the present invention provide a method, a computer program product, and a computer system, for reading data stored in a set associative cache.

One or more processors of a computer system relaunch a cache read instruction that did not read the set associative cache after being previously launched, wherein an effective address (EA) of the instruction was ascertained prior to the relaunching and after the instruction was previously launched, wherein the set associative cache includes G address groups encompassing all of the cache's stored data, wherein each address group comprises S sets and C classes, wherein S mod C=0 and each class comprises S/C sets, wherein each class has a read enable, and wherein G is at least 1, S is at least 2, and C is at least 1.

The one or more processors determine a hash of the ascertained EA (EAHash) and a cache congruence class (CCC) from the ascertained EA.

The one or more processors search for a match of the EAHash and a CCC of the ascertained EA to an EAHash and a CCC, respectively, of an instruction whose EAHash, CCC, and set are stored in an instruction history stream.

If the match is found from the search, then the stored set of the match is referred to as an inferred set and the one or more processors activate only read enables associated with the inferred set which is a read enable of only one class of one address group in the cache. If the match is not found from the search, then the one or more processors activate all read enables of the one address group in the cache.

BRIEF DESCRIPTION OF THE DRAWINGS

FIG. 4 is a flow chart of a process for activating a read enable of only one class of one address group in the cache, in accordance with embodiments of the present invention.

FIG. 5 is a flow chart of a process for selectively precharging global bit lines of at least one static random-access memory (SRAM) in the cache, in accordance with embodiments of the present invention.

FIG. 7 depicts a computing environment which contains an example of an environment for the execution of at least some of the computer code involved in performing the inventive methods, in accordance with embodiments of the present invention.

DETAILED DESCRIPTION

Figure 1:
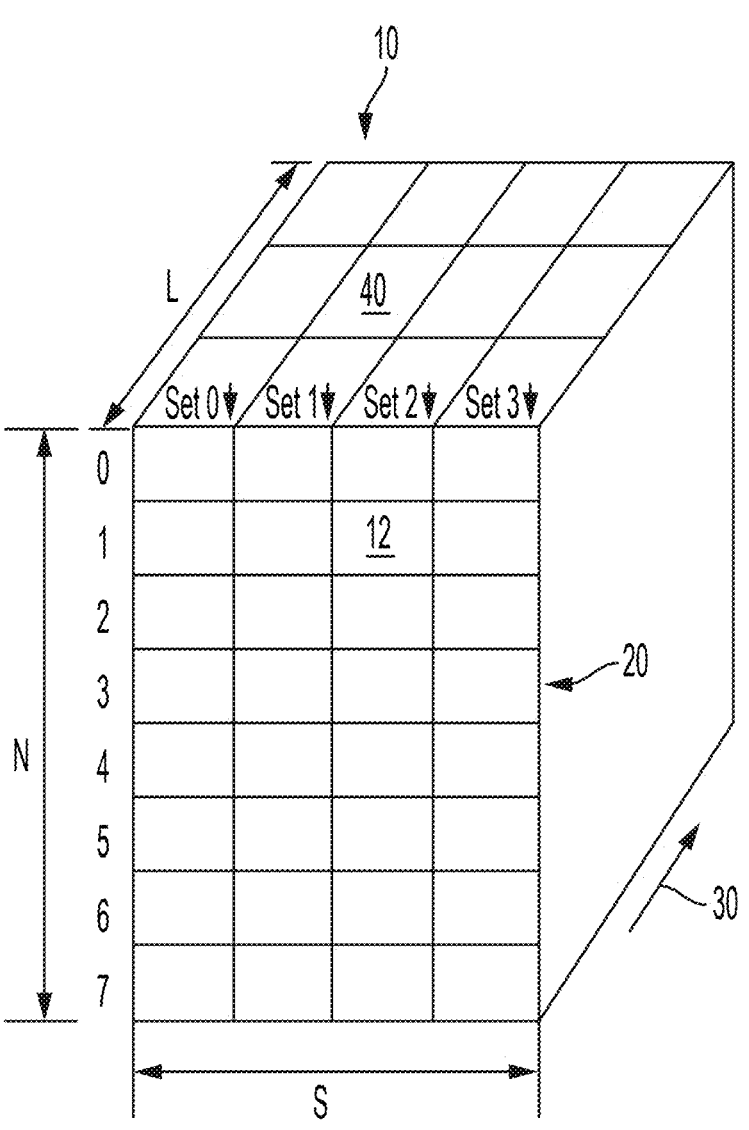
FIG. 1 depicts a set associative cache, in accordance with embodiments of the present invention.

Embodiments of the present invention provide a method, system and computer program product for accessing data in a set associative cache efficiently at reduced power consumption.

Computer processor Level 1 caching mechanisms are required to be as fast as possible to be effective, so much so that often consideration for implementing low power alternative schemes are shunned due to the caching mechanisms' inherently deliberate design style that typically favors power economy over speed.

L1 caches are typically built with set associativity arrangements that give rise to anywhere from 4 to 16 sets of data being accessed within the structure in parallel for highest performance. Performance studies of different designs typically show that increasing the number of sets that make up the congruence class is the most effective way of increasing a cache's usefulness; for example, using 16 sets instead of 8 sets for a cache structure of similar capacity (32 K bytes for example). To that end, recently designed L1 cache mechanisms typically have a set-prediction scheme that runs somewhat in parallel to the addressing access method of the cache structure itself. The set-prediction method delivers a reasonable choice of which of the simultaneously accessed 4 to 16 sets, depending on the design, will be selected to continue forward in the pipeline toward delivering this data result to the central processing unit (CPU).

The designs with the largest set-associativity will consume the most power but may be grudgingly justified by the need for high performance.

Although power could be saved by a power-saving design that includes waiting for the set prediction to complete before accessing the cache, and then accessing only the set that is chosen by the set-prediction method, an intolerable delay would be placed onto every cache access, so that this power-saving design may not be sufficiently efficient to be useful in practice.

Embodiments of the present invention provide a new power-saving design having the highest performance that is offered commonly by today's high set-associativity designs, with a new method that implements this new power-saving design and saves a significant amount of power.

Fast L1 caches typically have a set prediction mechanism connected to a late-select multiplexing function that reduces the many sets accessed in parallel down to a single set of data that is presented to the lower stages of the cache readout pipeline. The most effective set prediction methods utilize an addressing scheme that uses the same effective address that is generated for the data cache and, depending on the computer architecture, can use the addition of 2 or 3 operands derived from general purpose registers (GPRs) or from Invoke Medium Map (IMM) fields taken from the instruction. Processor performance depends upon there being zero wasted time delay in accessing the data cache as soon as this effective address generation is completed, so that some designs will employ a sum-addressing scheme built right into the data cache or the set prediction (SETP) (or both) to reduce the latency as much as possible.

Because both the data cache and the SETP array are stimulated by the same generated address source, a race condition occurs on every data cache data cache access. The data cache has a structure that is large and may be built from multiple static random-access memories (SRAMs) in a way that achieves the desired capacity and desired data bandwidth. This structure is always bigger and slower than the competing SETP design when it comes to the final result produced by either the data cache or the SETP array. The SETP array may use a hashed address matching scheme that is designed to be robust enough to be effective at producing a reasonably accurate prediction, but fast and small enough to be able to produce a predicted result before the data cache access has reached the point where the predicted set is needed to perform the late-selected multiplex at the data cache outputs. Thus, there is usually no room in the tightly compacted design space to consider methods to reduce the power of the data cache accesses, which can be seen to be some of the largest power expenditures in a modern CPU.

Embodiments of the present invention provide an effective power savings that presents no performance losses to be balanced against the power advantages.

FIG. 1 depicts a set associative cache 10, in accordance with embodiments of the present invention.

The cache 10 an N-way cache having a three-dimensional structure of dimensions S×N×L structured as an S×N plane 20 at a front surface of the cache 10 and L blocks extending in a depth direction 30 normal to the S×N plane 20 where block 40 is a representative block. N denotes the associativity which is the total number of rows (i.e., N=8 with 8 rows 0, 1, 2, 3, 4, 5, 6, 7 in FIG. 1). S denotes the number of sets which is the number of columns (i.e., S=4 with 4 sets 0, 1, 2, 3 in FIG. 1). In one embodiment, each block holds 1 byte of data.

The S×N plane 20 includes S×N cells of which cell 12 is a representative cell located at the intersection of row 1 and set (or column) 2. For a given cell in the S×N plane 20, the central processing unit (CPU) reads or writes an entire cache line of L blocks. Thus, if L=64 and if an instruction accesses a single variable at some address, the CPU will access the entire 64 block cache line that the variable belongs to.

In FIG. 1, S=4 and N=8. The 4 sets are sets 0, 1, 2, and 3 and are represented as columns 0, 1, 2, and 3, respectively, which represent a 4-way associativity. The 8 rows are rows 0, 1, 2, 3, 4, 5, 6, and 7 which can be accessed by a decoded CCC comprised of 3 bits, enough to determine which of the 8 rows are being accessed. In one embodiment, N is at least 2, S is at least 2, and L is at least 2.

An effective address (EA) that identifies a location in the cache 10 can be derived from an instruction that involves a load/store operation by combining two or more operands of the instruction by an adder.

In one embodiment, the effective address (EA) includes the following fields: index, tag, and offset. The index identifies the set. The tag identifies the associativity and also identifies a cache congruence class (CCC) which encompasses all sets in the row specified by the tag. The offset identifies a block within a cache line. The combination of index and tag identifies a specific cache line of L blocks by identifying a specific cell in the S×N plane at which the cache line exists. The offset identifies a block number within a specific cache line identified by the combination of index and tag.

In one embodiment, the effective address (EA) has a structure of sequentially ordering the tag, index, and offset, wherein the offset is specified by lowest bits, the tag is specified by highest bits, and the index is specified by middle bits.

For example, if the effective address (EA) is 0011 10 01, the offset is 01, the index is 10, and the tag is 0011, which identifies block 01 (offset) of the cache line specified at the cell (row 0011, column 10) determined by the combination of tag 0011 and index 10. The cache congruence class (CCC) is the row identified by the tag 0011.

Generally, the tag, index, and offset may be sequenced in any other sequential order within the effective address (EA). Moreover, any other method of partitioning the effective address (EA) may be used for identifying a cell, and a block in the cache line at the identified cell.

If the CPU requests data from the cache at the effective address (EA), a cache hit occurs if the data is found at the effective address (EA) in the cache, which implies that the data needed by the CPU is already present in the cache, so there's no need to fetch the data from the slower main memory (e.g., RAM) or other storage. A cache miss occurs if the data is not found at the EA in the cache.

Figure 2:
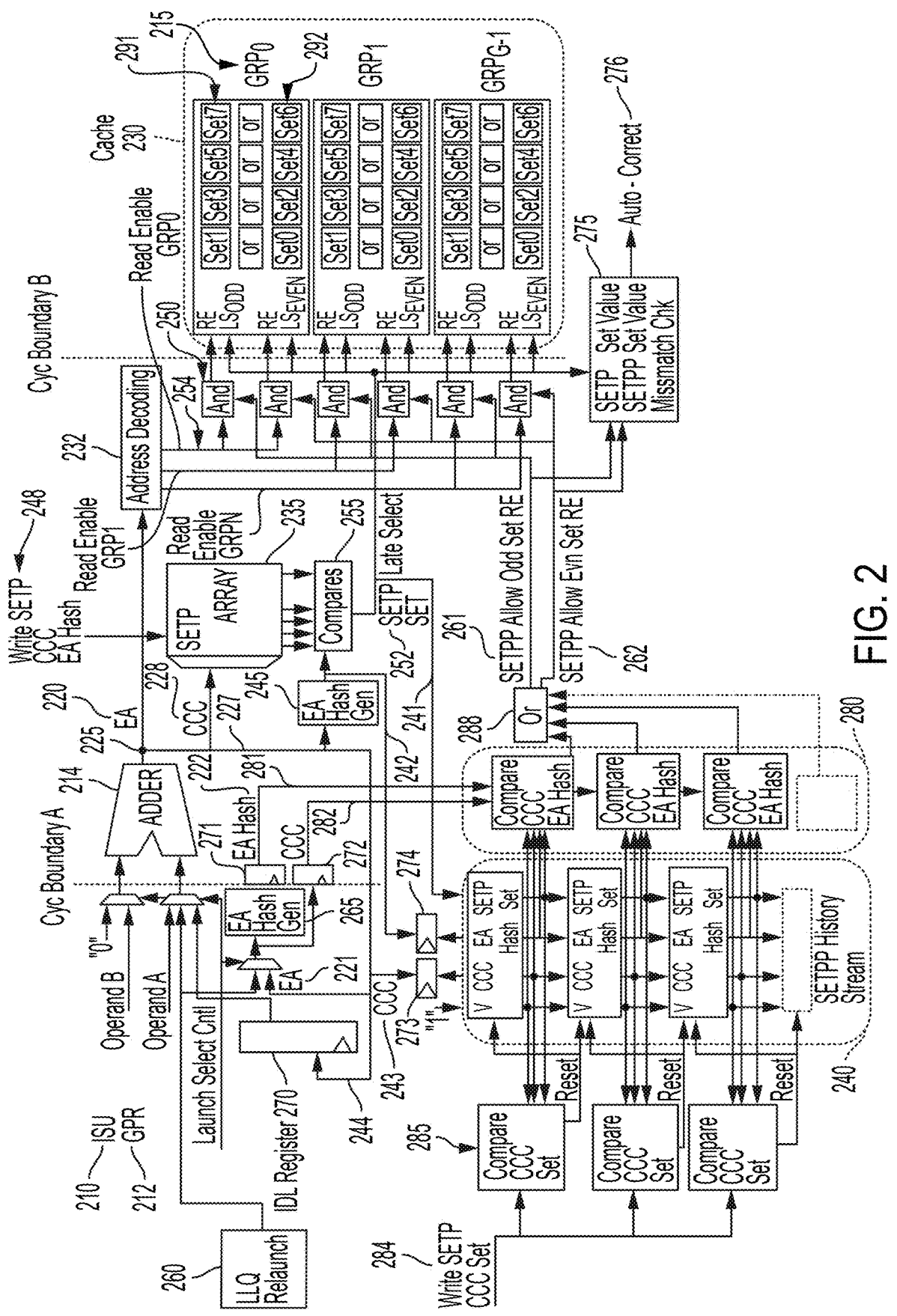
FIG. 2 depicts a load/store system for accessing data from a set associative cache organized into address groups configured with static random-access memories (SRAMs), in accordance with embodiments of the present invention.

FIG. 2 depicts a load/store system for accessing data from a set associative cache 230 organized into address groups 215 configured with static random-access memories (SRAMs), in accordance with embodiments of the present invention.

In one embodiment, the cache 230 is organized into G address groups 215 ($GRP_0$, $GRP_1$, . . . , $GRP_{G-1}$). The G address groups encompass addresses for accessing all of the data stored in the cache 230. Each address group of the G address groups 215 includes: (i) S sets and C classes subject S mod C=0 and each class comprising S/C sets, wherein C is at least 2 and S is at least C; and (ii) at least one SRAM. A class of a given address group is a subgroup of the given address group.

In the embodiment of FIG. 2, S=8 (set 0, 1, 2, . . . , 7) and C=2 (class 291 of odd numbered sets 1, 3, 5, and 7, and class 292 of even numbered sets 0, 2, 4, and 6, with OR gates between respective sets of the classes 291 and 292. Each class of classes 291 and 292 has at least one SRAM.

For an address group that includes multiple SRAMs, individual SRAM may be associated with one or more sets and/or one or more classes. In one embodiment, each class of each set may have one associated SRAM.

In one embodiment, the cache 230 is an L1 cache. Generally, an L1 cache is configured for faster access of data than is an L2 cache or an L3 cache. However, an L1 cache has a lower storage capacity than does an L2 cache or an L3 cache.

Generally, the architecture of the cache 230 can be configured to have each SRAM encompass any combination of one or more sets in each class of sets within each address group.

Generally, the number of address groups (G) depends on the architectural design of the cache 230 with respect to cache addressing and associated SRAMs.

In one embodiment, an instruction sequencing unit (ISU) 210 issues an instruction that comprises two operands A and B, wherein a general purpose register (GPR) 212 delivers the operands A and B to an Adder 214 which combines the operands A and B to generate an effective address (EA) 220 that is used to access a cache line in the cache 230 by being decoded into an address group of address groups $GRP_0$, $GRP_1$, . . . . $GRP_{G-1}$ by Address Decoding 232. In another embodiment, the instruction comprises three operands A, B and C (though operand C is not shown in FIG. 2) that are combined by the Adder 214 to generate the effective address (EA) 220.

A cache congruence class (CCC) 228 may be determined from the EA 220 in dependence on the bit configuration of the EA 220 as is known in the art.

Speed of access is facilitated by a set prediction (SETP) array 235 which has the same structure of rows and columns as cache 230. However, the SETP array 235 contains much fewer blocks of data than in the cache line existing at a corresponding cell in the cache 230. For example, the cache line existing at a corresponding cell at cache 230 may contain 64 bytes, 128 bytes, 256 bytes, etc. in an embodiment, whereas the data at each cell of the SETP array 235 may contain 8 bits, 10 bits, 12 bits, etc. in an embodiment. Thus, the readout of the data in the SETP array 235 is much faster than readout of the data in the cache 230.

In one embodiment, the data stored at each cell in the SETP array 235 is: a subset of an EA, the EA, or a hash (EAHash) of the EA. Use of EAHash for performing comparisons via Compares 255 is faster than use of the EA for performing the comparisons via Compares 255, because the EAHash includes fewer bits than does the EA. Use of the EAHash for performing the comparisons via Compares 255 is typically very accurate (e.g., 98% accurate) and is thus very close to the 100% accuracy that would be obtained with use of the EA (instead of EAHash) for performing the comparisons via Compares 255.

The data stored in the SETP array 235, which is fixed and can be used in conjunction with processing any instruction, can be generated via the following process. For each processed instruction, data 248 (EA or EAHassh, CCC, SETP determined set) is stored in each cell of the cache 230, this data is placed at the corresponding cell of the SETP array 235 for as many processed instructions as needed to fill every cell of the SETP array 235.

The SETP array 235 can be used to determine a SETP determined set 252 using Compares 255 for comparing the EA 220 outputted by the Adder 214 (or the EAHash of the EA 220) with the EA (or EAHash) for the CCC 228. The set (i.e., SETP determined set 252") associated with the EA 220 is selected from the S sets by either (i) a front-end process or (ii) a late selecting back-end process. The late selecting backend-end process is faster than the front-end process but uses more power than the front-end process.

In the front-end process, the previously determined CCC 228 isolates a portion of the SETP array 235. Then the EA 220 determined by the Adder 214 (or EAHash of the EA 220) is compared, via Compares 255, with the EA (or the EAHash) stored in the SETP array 235, which determines the specific SETP determined set, which in turn activates just one read enable (RE) of the S read enables in the pertinent SRAM in the cache 230), resulting in the cache line of only one set of the S sets being read in the cache 230 for the CCC 228. If the preceding comparison is an EAHash comparison, then the EAHash of the EA 220 determined by the Adder 214 is generated by EA Hash generator 245. The preceding front-end process saves power by reading just one set instead of reading the S sets. However, the front-end process takes extra time (typically, an entire extra cycle of time in comparison with the late selecting back-end process), which significantly reduces the speed of obtaining the data of the cache line that is read.

In the late selecting back-end process, the previously determined CCC 228 is used to read all of the S sets for the CCC 228, followed by using a late selecting multiplexor in the cache 230 (not shown in FIG. 2) to choose the correct set from the S sets to identify which of the already-read cache lines is associated with the chosen correct set. The preceding late selecting back-end process is faster than the front-end process, but consumes significantly more power since all S sets for the CCC 228 in the cache 230 are read even though only one set of the S sets is needed.

Embodiments of the present invention avoid the huge time consumption of the front-end process and avoid much of the power consumption of the late selecting back-end process, by using a stored history stream (SETPP) 240 of past uses of the cache 230 in conjunction with a novel architecture of the cache 230 that divides the sets of an address group into set classes within address groups. In FIG. 2, there are 2 classes of sets in each address group, namely a class 291 of odd sets (1, 3, 5, 7) and a class 292 of even sets (0, 2, 4, 6).

Generally, the S sets for a given CCC are divided into C classes subject to S mod C=0 with S/C sets in each class, wherein C is at least 2 and S is at least C. Thus for S=8, possible C classes include, inter alia: (i) C=2 (class of odd sets 0, 1, 3, 7; class of even sets 0, 2, 4, 6), (ii) C=4 (classes of: sets 0 and 1, sets 2 and 3, sets 4 and 5, sets 6 and 7) or (classes of: sets 0 and 2, sets 1and 3, sets 4 and 6, sets 5 and 7); (iii) C=8 (class of set 0, class of set 1, class of set 2, class of set 3, class of set 4, class of set 5, class of set 6, class of set 7).

Each class of the C classes for each address group has a read enable (RE) and a late select (LS). Embodiments of the present invention use And gates 250 to selectively disable all read enables (REs) in the C classes except the read enable (RE) associated with the correct class to be read for the selected CCC. For example, for C=2 (class of odd sets; class of even sets), if only odd sets are allowed (by methodology discussed infra), then the And gates 250 perform AND logic on inputs of the address groups 254 and the Odd SETPP Allow 261 which has an effect of disabling the RE of the even sets in the pertinent address group to be accessed, which avoids expending power for reading the even sets in the pertinent address group to be accessed.

The following discussion is for C=2 (class of odd sets; class of even sets) but is applicable to any value of C and associated class representations. The following discussion for C=2 explains how to determine whether to: (i) allow odd sets 261 (i.e., disable the RE of the even sets in the pertinent address group 215), (ii) allow even sets 262 (i.e., disable the RE of the odd sets in the pertinent address group 215); or (iii) allow both odd set and even sets because circumstance do not enable a determination of whether to allow either the odd sets or the even sets of the pertinent CCC.

Registers 271, 272, 273 and 274 exist for pipeline cycle matching.

For an instruction issued by the ISU 210, a first attempt to read data from the cache 230 may fail due to, inter alia: an erroneous EAHash comparison 255; a banking conflict in a SRAM (i.e., trying to simultaneously read and write in the same bank); and an issue-delay-launch (IDL) recycling of a new instruction due to a timing conflict with a previously failed instruction that is being relaunched.

For an instruction issued by the ISU 210, if a first attempt to read data from the cache 230 fails, then the instruction may be relaunched from a Load Launch Queue (LLQ) 260 which contains the EA 221 of the instruction for which the first attempt to read data from the cache 230 failed. Since the EA 221 of the instruction is known from the first attempt to data from the cache 230, the EA 221 can be moved to a point 225 via an intermediary multiplexor (not shown in FIG. 2) located between EA 221 and point 225 so that the EA 221 replaces EA 220 in another attempt to access the cache 230, thus avoiding the adder 214 and avoiding having to reissue the failed instruction by the ISU 210.

If failed instructions accumulate in the LLQ 260 after which a new instruction is issued from the ISU 210, in some embodiments the accumulated instructions in the LLQ 260 and the new instruction issued by the ISU 230 are processed for reading data from the cache 230 in a sequential ordering according to instruction age, so that the oldest instructions in the LLQ 260 may be processed before the new instructions issued by the ISU 210, which results in the IDL recycling of the new instructions characterized by new instructions being sequentially recycled through the IDL register 270 in a path to the point 225 and back to the IDL register 270 via path 227 until the new instructions can be fully processed. It is noted that the EA of the new instruction is saved in the IDL register 270.

Thus, the EA is known at EA 221 for both the IDL recycling of the new instruction in the IDL register 270 and the failed instruction residing in the LLQ 260. In contrast, the EA 220 of the instruction issued from the ISU 210 is not known until the operands A and B have been added by the Adder 214. Storage of the EA at EA 221 for any instruction is utilized by embodiments of the present invention in conjunction with the an instruction history stream (i.e., SETPP history stream 240) to allow either class 291 of the odd sets or the class 292 of the even sets of cache lines to be read from the cache 230 for the CCC, which saves time and power and is applicable to any instruction whose EA is known at EA 221.

Specifically, the EAHash and CCC may be obtained, paths 281 and 282, respectively, for any instruction whose EA is known at EA 221, wherein the obtained EAHash and CCC serve as input to Compares 280.

The SETPP history stream 240 is a data buffer whose content is K arrays of data denoted as $B_1, \ldots, B_K$, wherein the buffer depth K is constant and has a value of at least 2. In one embodiment, K is in a range of 3 to 5. The K arrays of data are dynamically obtained from load/store operations on the cache 230 from previous instructions issued from the ISU 210 and read by the cache 230, wherein the SETP determined set, the EAHash, and the CCC are obtained from the previous instructions via paths 241, 242, and 243, respectively.

A new array of data from an instruction being processed enters the SETPP history stream 240 and triggers the following restructuring of the SETPP history stream 240: $B_K$ is dropped (i.e., disappears), $B_{K-1}$ replaces $B_K, \ldots, B_1$ replaces $B_2$, and the new array of data replaces $B_1$.

Each array $B_k$ (k=1, . . . , K) includes (V, CC, EAHash, SETP determined set) as depicted explicitly in the SETPP history stream 240 and obtained from a previously issued instruction as follows: (i) SETP determined set is the SETP Set 252 determined by the SETP Array 235, (ii) EAHash is the EAHash that was generated by the EA hash generation 245 for SETP determined set matching, (iii) the CCC is the CCC that was derived from the EA 220 that emerged from the Adder 214 and was used in conjunction with the SETP Array 235 to identify the set, and (iv) a history valid bit (V) indicating whether this level of the instruction history can be used for SETPP matching purposes, The valid bit (V) is initially set to "1' when a new for a new instruction entering a top level of the SETPP History Stram 240 and may be changed to "0" under conditions discussed infra.

Each array $B_k$ (k=1, . . . , K) in the SETPP history stream 240 may additionally include the thread of the instruction used for the SETP determined set matching and/or indicators to show if the SETP determined set matching produced a valid hit, a miss, or a multihit.

The SETPP history stream 240 can have any buffer depth that is desired by the designer. The deeper the history, the more effective the SETPP matching can be. Empirical studies by the inventors have demonstrated that a good range of history depth is 3 levels at a minimum, and 5 levels are very effective without overkill. If there is a SETPhit or a SETPmiss on a valid load launch, the SETPP history stream 240 is written, with previous values cascading down toward the deeper levels. That deepest value simply falls off the end.

There is no movement within the stream without an addition of a new entry at the top. Thus, there are no repetitive values in the stream, and the entries that are built for this purpose can be the most effective.

If Compares 280 determines the EA (or EAHash) and the CCC associated with EA 221 (which are accessed via respective paths 281 and 282) match the EA (or EAHash) and the CCC in one array $B_{k1}$ in the SETPP history stream 240, then the SETP determined set in one array $B_{k1}$ in the SETPP history stream 240 is taken as the SETP determined set value to be used to determine, using the OR gate address group in the cache 230.

The allowed class 291 or 292 of odd or even sets, respectively, and classes of the address groups $GPR_0$, $GPR_1, \ldots GPR_{G-1}$ 254 are inputted to the And gates 250, which results in disabling the read enable (RE) of the class 292 of even set or the class 291 of the odd sets for a class of an address group selected by the AND gates 250, thus avoiding power consumption for the sets in the disables class. Thus, whenever an instruction is relaunched from the LLQ 260, if there is a SETPP history stream 240 match, much power can be saved at no cost to performance.

The valid bit (V) is reset to 0 in one array $B_{k2}$ in the SETPP history stream 240 if there is a write 284 to the SETP Array 235 at a location that corresponds to array $B_{k2}$, because such writing to the SETP Array 235 is highly likely to change the EAHash, which would make the existing EAHash in the array $B_{k2}$ irrelevant. $B_{k2}$ is determined by a match, via compares 285, of both CCC and the SETP determined set of the write 284 and the $B_k$ arrays in SETPP History Stream 240. The array $B_{k2}$ whose valid bit is reset to 0 moves down in the SETPP history stream 240 as new a new array replaces $B_1$ in the SETPP history stream 240. Thus, the valid bit is reset to 0 in order to disable entries in SETPP History Stream 240 that have become stale.

The SETPP history stream 240 mitigates the running of a Load and Store Unit (LSU) at its highest throughput when there is the greatest concern for power dissipation maximums. It is also at this time that there is the greatest potential for backups in an Effective Address Generation (AGEN) pipeline due to any number of naturally occurring rejects in the perfectly continuous operation of the issue to AGEN launch pipeline, including but not exclusively, data cache bank collisions, directory misses, load hit reloads, . . . , etc. All of these rejected instructions will need to relaunch from the LLQ 260 and make another attempt at accessing the cache 230. Any instruction relaunching from the LLQ 260 will already have its EA fully computed and available early in the relaunch pipeline. As such, the cache congruence class (CCC) field of the EA is available early enough to act as a search operand against all of the previous instructions stored in the SETPP history stream 240. Searching the SETPP history stream 240 is at least ½ cycle faster than the latency needed to fully resolve a SETP determined set 252 access. This SETP determined set value in the SETPP history stream 240 can be used as advanced knowledge of the set value and can be used to shut down unneeded portions of the cache 230 where the not-to-be-used sets reside.

Potential performance losses relate to the rejected sets, and a relaunch instruction from the LLQ 260 may collide with an issued instruction from the ISU 210. When a load instruction is using the IDL pipeline path, similar to the relaunched instructions described supra, the IDL instruction also has its EA or EAHash (and also its CCC) computed and available early in its AGEN pipeline. So, an IDL instruction also has the benefit of being able to access the SETPP history stream 240 which, like the LLQ instruction, can save power in the cache 230 if a SETPP match of EA (or EAHash) and CCC is achieved. At times of busy and continuous loads issued by the ISU 210, even just one relaunch from the LLQ 260 can shift the operational mode of launching to IDL mode for many cycles at a time which is the case for dense issue of intensive workloads such as DAXPY, DDOT and many others. Thus, for the most intensive workloads of the cache 230, the SETPP history stream 240 is available for a large percentage of the time. All that is needed is to build an adequately deep SETPP history stream 240 to increase the likelihood of a SETPP match. Indeed, most of these work-loads make multiple access to the same cache line when streaming data to a CPU for intense computation.

The matching path of the SETPP history stream 240 may have approximately a ½ cycle timing advantage over the SETP Set access 252 and the cache 230 addressing paths. When the access to the cache 230 begins, the traditional paths have to flow through a carry-propagate adder 214 to form the EA, at least up to and including the most significant bit (MSB) of the CCC. Then the split paths flow to the cache 230 addressing controls, designed to access the portion of the cache 230 where the wanted data resides. Simultaneously, the CCC portion of the EA flows to the SETP Array 235 as well as the access to the cache 230 to begin the access for those arrays. Then the EAHash is generated for SETP matching to create the late-select, which in most cases is the longer of the two paths (thus the name "late-select"). These latencies are on the order of ¾ of a cycle. Alternatively, the SETPP matching path begins the cycle with the CCC and the EAHash already known, and the SETPP history stream 240 compares and assembly require about ½ cycle latency which is just enough to be ahead of the cache 230 read enable (RE) path. There is a new AND gate 250 inserted into the path of the cache 230's read enable (RE), where the And gate 250 should be replacing a distribution buffer, causing a negli-gible increase in latency (i.e., only a couple of picoseconds) of the read enable path.

Although FIG. 2 depicts one pipeline, embodiments of the present invention may include a Load/Store Unit (LSU) system having multiple AGEN pipelines running in parallel (e.g., from 2 to 4 parallel pipelines). Each pipeline has its own adder and feedback mechanism and will store a sepa-rate SETPP history stream that is related to a particular pipeline, and may experience set hit or set miss results for each pipeline usage. When a new instruction enters a certain pipeline (e.g., pipeline A), a search may be performed across all SETPP history streams (e.g., streams B, C, D). A match from any SETPP history stream can be applied to the instruction doing the search. Generally, there is one cache that is used for all pipelines, A SETPP history stream 240 entry may indicate a valid level in which the valid bit is 1 and the particular SETP determined set has an invalid set value; e.g., if S=12 then 4 bits can be used to indicate a valid set value in a range of 0 to 11 and an invalid set value in a range of 12 to 15 (thus the invalid SETP determined set in the SETPP history stream 240 entry is 12, 13, 14 or 15). A presence of an invalid set value of the SETP determined set in the SETPP history stream 240 is indicative of a previous SETPmiss which occurs for an instruction that attempted to read non-existent data from a cache line at this particular SETP determined set. Accordingly, a match of EAHash and CCC for an entry in the SETPP history stream 240 with a valid bit of 1 and an invalid SETP determined set value would result in not attempting to access the cache 230.

Occasionally a SETP determined set will produce a mul-tihit SETP determined set match (i.e., a hit on two different set values on two respective sets in the SETP array 235 which may be due to the approximate nature of EAHash usage compared with actual EA usage), which may be treated like a SETPmiss for which the two SETP determined set values in the SETPP history stream 240 are set to an invalid SETP determined set value, and similarly the result requires the instruction to resolve the problem without attempting to access the cache 230.

If the cache 230 contains multiple SRAMs that are separately addressable, and if the multiple sets that make up the set-associativity are dispersed across different SRAMs or cache 230 cores, then the SETPP power saving action is particularly easy to be applied. The SETPP matching result must be known before the cache 230 read enabling action is initiated, which is possible if the SETPP history stream 240 depth is not excessively deep. Thus, the read enable initia-tion can be blocked before ever reaching the portion of the cache 230 structure that the SETPP history stream 240 deems is not needed. In one embodiment, the caching structure will have the full allotment of the sets split over at least 2 separate SRAMs. FIG. 2 shows that the class 291 of odd numbered sets are separated from the class 292 of even numbered sets. The odd and even numbered sets are com-bined centrally by a custom OR gate between the 2 SRAMs.

The SETPP history stream 240 information can be used internally within the SRAM as well to reduce power. Even on the portion of the cache 230 structured SRAM that is activated (i.e., read enable not blocked), embodiments of the present invention are able to save power. There is a circuit common to all SRAMs called a dynamic global bit line (GBL) that discharges for every bit per set being read out. The switching of the dynamic global bit lines is the biggest contributor to power consumption for cache read operations, taking about 50% of the total read power. Conventionally, the GBLs are designed to be precharged at the beginning of a read cycle, through a network, sourced by the read enable, fanning out to all of the GBLs, because it is not known in advance which set is to be read out.

Embodiments of the present invention use a process in which the GBLs are arranged in a set-specific pattern and can be connected via the precharge network in a set-specific way, so that only GBLs associated with sets of interest need to be precharged in a given read cycle. Only one gate need be added to the network to control which GBLs get pre-charged. There is tight timing associated with the preceding process, so care must be taken to assure that the SETPP information arrives at the SRAM in time to feed this controlling one gate before the precharging flow arrives.

For example, assume that S=12 so that sets 0-11 could be activated and that the selected set is set 9 denoted in binary as 1001, so the least significant bit (LSB) is 1 and the upper bits are 100. The LSB of 1 allows only the odd sets (1, 3, 5, 7, 9, 11) and power need not be supplied to the even sets (0, 2, 4, 6, 8, 10) for which the REs are not activated. The upper bits 100 can also be utilized to save power on a portion of the odd sets depending on how the odd sets are organized in the SRAM design. If sets (1, 3, 5) are in a first subclass of the class of odd numbered sets, and sets (7, 9, 11) are in a second subclass of the class of odd numbered sets, it is clear that the set to be activated (9) is in the second subclass. Therefore, the bits of the sets (1, 3, 5) of the first subclass need not be precharged which saves power.

As with any other logic device built from transistors, there may be faults in the chip that may eventually lead to errors. As a safety measure, the Set value 261 or 262 from the SETPP history stream 240 is compared, via Compare 275, against the SETP determined set value 252 that is produced for an instruction via SETP array 235. Those 2 values (i.e., the SETPP value 261 or 262 and the SETP determined set value 252) should always match each other. If those 2 values do not match, then there is either an incorrect SETPP value or an incorrect SETP determined set value. Either way, data read from the cache 230 for that instruction is incorrect and cannot be used. At that point, one or more of the following actions may be performed as Auto-Correct 276 to mitigate incorrect data having been read from the cache 230: (i) the valid bit (V) in the SETPP history stream 240 is set to zero (invalid); (ii) all of the instructions having valid bits (V) of 1 are purged from the SETPP history stream 240; (iii) a predetermined diagnostic/recovery procedure for the SETP array 235 is performed which may include initializing the core to a clean state and cleaning the SETP array 235; and (iv) access to the cache 230 is treated same as a bank-collision is treated, wherein the instruction is recycled to the LLQ 260 as discussed supra and may be aged out of the SETPP history stream 240 as new instructions are processed.

Figure 3:
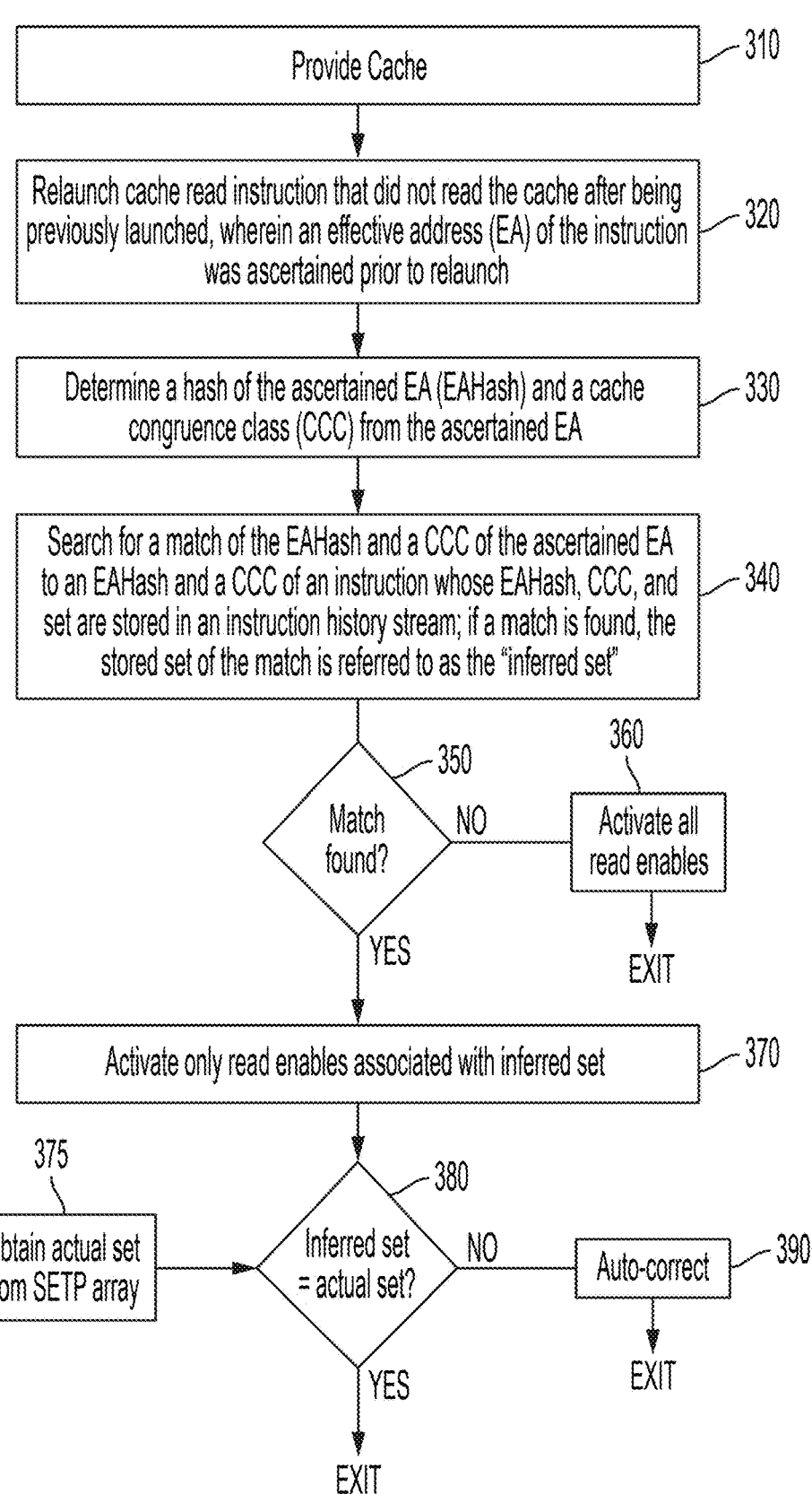
FIG. 3 is a flow chart of a computer-implemented method for reading data stored in a set associative cache, in accordance with embodiments of the present invention.

FIG. 3 is a flow chart of a computer-implemented method for reading data stored in the set associative cache 230, in accordance with embodiments of the present invention. The flow chart of FIG. 3 includes steps 310-390.

Step 310 provides the set associative cache 230 comprising G address groups 215 encompassing all of the cache's stored data, wherein each address group comprises S sets and C classes, wherein S mod C=0 and each class comprises S/C sets, wherein each class has a read enable, and wherein G is at least 1, S is at least 2, and C is at least 1.

For example, if S=8 (sets 0, 1, . . . , 7 and C=2 then each class includes 4 sets. In one embodiment, the 2 classes are a first class that includes the 4 odd numbered sets (1, 3, 5, 7) and a second class that includes the even numbered sets (0, 2, 4, 6). The particular sets in each class depends on the design of the address groups and associated SRAMs.

Step 320 relaunches a cache read instruction that did not read the cache after being previously launched, wherein an effective address (EA) of the instruction was ascertained prior to said relaunching and after the instruction was previously launched. In one embodiment, relaunching the cache read instruction comprises relaunching the cache read instruction from the load launch queue 260 that includes the ascertained EA.

In one embodiment, the cache read instruction that did not read the cache may have been previously launched by the ISU 210 after which the EA was determined via Adder 214 by combing operands of the previously launched instruction. The cache read instruction that did not read the cache is relaunched from the Load Launch Queue (LLQ) 260 which includes the EA previously determined by the Adder 214.

Step 330 determines, via hash generator 265, a hash of the ascertained EA (EAHash 222) and a cache congruence class (CCC 223) from the ascertained EA 221.

Step 340 searches for a match, from comparison 280, of the EAHash and a CCC of the ascertained EA to an EAHash and a CCC of an instruction whose EAHash, CCC, and set are stored in an instruction history stream, wherein if a match is found, the stored set of the match is referred to as the "inferred set". The instruction history stream is the SETPP History stream 240.

In one embodiment, the instruction history stream (i.e., the SETPP history stream 240) is a dynamically changing data buffer of constant depth K that stores an array of data for each processed instruction of K previously processed instructions. The K arrays of data (B$_1$, . . . , B$_K$) are sequentially ordered in the buffer according to a latest time of entry into the buffer of the processed instructions such that each new processed instruction entering the buffer results in the instruction having the earliest time of entry into the buffer being dropped out of the buffer.

Each stored array B$_k$ (k=1, . . . , K) includes an EAHash, CCC, and set value determined by the instruction's use of the SETP array, wherein K is at least 2. In one embodiment, K is in a range of 3 to 5. In one embodiment, K=5.

In one embodiment, each stored array B$_k$ (k=1, . . . , K) further includes a valid bit (V) having a binary value of 1 or 0 denoting that the processed instruction is valid or invalid, respectively, wherein the valid bit is set to 1 for each processed instruction entering the buffer.

In one embodiment, in response to a determination that a CCC and the SETP determined set of a cache write instruction respectively matches a CCC and a SETP determined set in one stored array in the buffer and that the valid bit of the one stored array is 1, the valid bit is set to 0 for the one stored array.

In one embodiment, a searching for a match (in step 340) results in a multihit SETP determined set match due to a hit on two different set values.

In one embodiment, an invalid SETP determined set in an array of one instruction in the instruction history stream is indicative of a SETPmiss due to the one instruction having attempted to read non-existent data from a cache line in the cache 230 at the invalid SETP.

Step 350 determines whether a match (of the EAHash and the CCC of the ascertained EA) was found in step 340.

If it is determined in step 350 that the match was found in step 340 (YES branch from step 350), then step 370 activates only read enables associated with the inferred set which is a read enable of only one class of one address group in the cache 230. An embodiment that implements step 370 is a process described infra in conjunction with FIG. 4.

If it is determined in step 350 that the match was not found in step 340 (NO branch from step 350), then step 360 activates all read enables of the one address group in the cache 230, followed by exiting the method.

Activation of read enables triggers a reading of only cache lines of the cache 230 that are associated with the activated read enables.

Step 375 obtains the actual set as the SETP determined set value 252 that is obtained for the relaunched instruction from SETP array 235.

After execution of step 370, step 380 determines whether the inferred step (obtained from the match found in step 340) is equal to the actual set (obtained from step 365). If so (YES branch from step 380), then the method exits. If not (NO branch from step 380), then step 390 performs Auto-Correct 276 to mitigate incorrect data having been read from the cache 230 as described supra, followed by exiting the method.

FIG. 4 is a flow chart of a process for activating a read enable of only the one class of the one address group in the cache 230, in accordance with embodiments of the present invention. The process of FIG. 4 is an embodiment that implements step 370 of FIG. 3 and includes steps 410-440.

Step 410 infers a class associated with the inferred set.

For example, if S=8 (sets 0, 1, . . . , 7 and C=2 then each class includes 4 sets. In one embodiment, the 2 classes are a first class that includes the 4 odd numbered sets (1, 3, 5, 7) and a second class that includes the even numbered classes (0, 2, 4, 6). If the inferred set is 3, then the inferred class is the class of the odd sets.

Step 420 address decodes the relaunched instruction, via Address Decoding 232, to determine the G address groups.

Step 430 logically combines the inferred class and the classes of the determined G address groups to identify the one class of the one address group in the cache 230. In one embodiment, step 430 implements the logically combining via use of multiple AND gates 250 comprising one AND gate for each class of each address group.

Step 440 activates the read enable of only the one class of the one address group in the cache 230.

For the preceding example of S=8, C=2 with a class of odd numbered sets (1, 3, 5, 7) and a class of even numbered set (0, 2, 4, 6) with the inferred set being 3, the read enable of only the class of odd numbered sets would be activated, and the read enable of the class of even sets would not be activated FIG. 5 is a flow chart of a process for selectively precharging global bit lines of at least one static random-access memory (SRAM) in the cache 230, in accordance with embodiments of the present invention.

For the process of FIG. 5, each class of each address group in the cache 230 includes at least one SRAM having global bit lines, wherein each class of each address group includes at least 2 subclasses. The process of FIG. 5 is performed prior to step 370 of FIG. 3 (i.e., prior to activation of only read enables associated with the inferred set).

The process of FIG. 5 includes steps 510-520.

Step 510 identifies a subclass of the one class of the one address group such that the subclass includes the inferred set.

For the preceding example of S=8, C=2 with a class of odd numbered sets (1, 3, 5, 7) and a class of even numbered set (0, 2, 4, 6) and with the inferred set being 3, the read enable of only the class of odd numbered sets are activated. Assume that the class of odd number set is divided into two subclasses of a first subclass of sets (1, 3) and a second subclass of sets (5, 7). Since the inferred set is 3, the identified subclass is the first subclass of sets (1, 3).

Step 520 precharges only global bit lines associated with the identified subclass, namely the first subclass of sets (1, 3) in the preceding example, so that the global bit lines associated with the second subclass of sets (5, 7) are not precharged.

The bit configuration of the inferred set could be used for implementing the processes of FIGS. 4 and 5. For example, for S=12 and C=2 with a class of odd numbered sets (1, 3, 5, 7, 9, 11) and a class of even numbered set (0, 2, 4, 6, 8, 10) and with the inferred set being 9 denoted in binary as 1001, the least significant bit (LSB) is 1 and the upper bits are 100. The LSB of 1 allows only the class of odd numbered sets (1, 3, 5, 7, 9, 11) and power need not be supplied to the class of even numbered sets (0, 2, 4, 6, 8, 10) for which the REs are not activated. The upper bits 100 can be utilized to save power on a portion of the odd sets depending on how the odd sets are organized in the SRAM design. If sets (1, 3, 5) are in a first subclass of the class of odd numbered sets, and sets (7, 9, 11) are in a second subclass of the class of odd numbered sets, then it is clear that the set to be activated (9) is in the second subclass. Therefore, the bits of the sets (7, 9, 11) of the second subclass need to be precharded, and the bits of the sets (1, 3, 5) of the first subclass need not be precharged which saves power.

Figure 6:
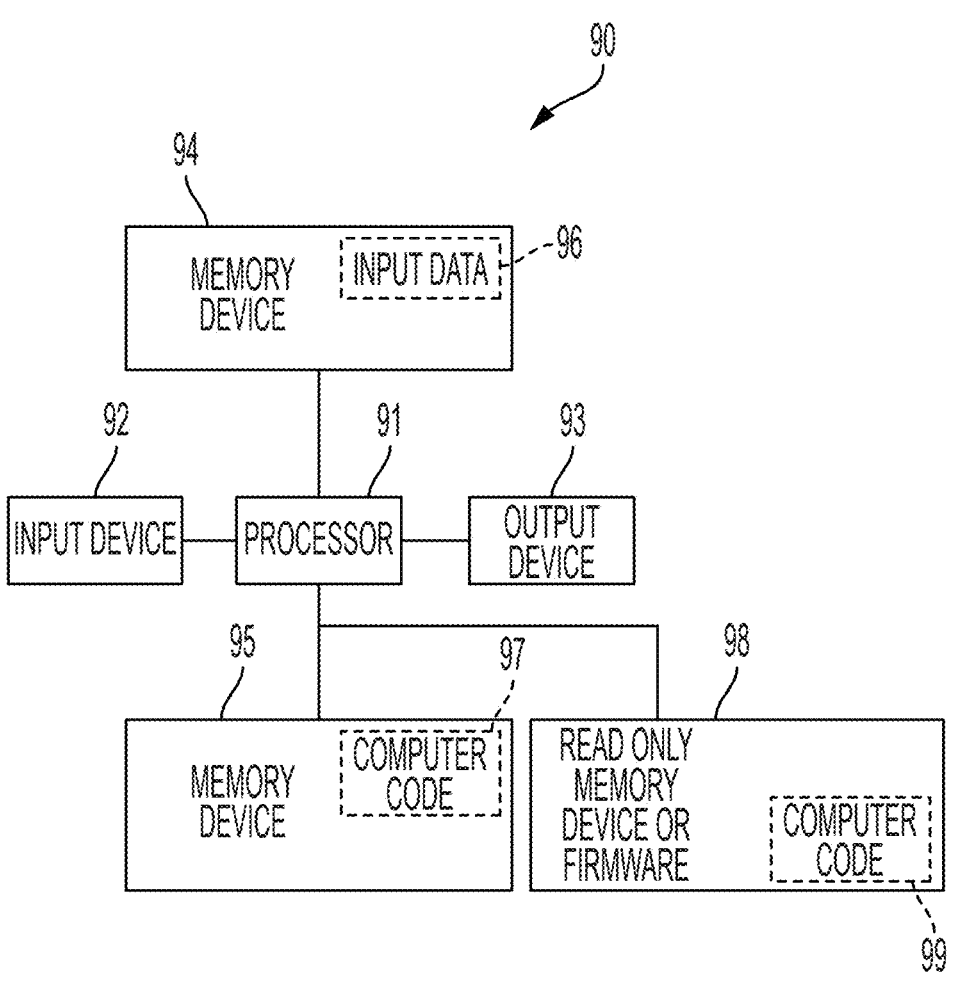
FIG. 6 illustrates a computer system, in accordance with embodiments of the present invention.

FIG. 6 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware datastorage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 7 depicts a computing environment 100 which contains an example of an environment for the execution of at least some of the computer code involved in performing the inventive methods, in accordance with embodiments of the present invention. Such computer code includes new code for reading data stored in a set associative cache 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reading data stored in a set associative cache, said method comprising:

relaunching, by one or more processors of a computer system, a cache read instruction that did not read the set associative cache after being previously launched, wherein an effective address (EA) of the instruction was ascertained prior to said relaunching and after the instruction was previously launched, wherein the set associative cache comprises G address groups encompassing all of the cache's stored data, wherein each address group comprises S sets and C classes, wherein S mod C=0 and each class comprises S/C sets, wherein each class has a read enable, and wherein G is at least 1, S is at least 2, and C is at least 1;

determining, by the one or more processors, a hash of the ascertained EA (EAHash) and a cache congruence class (CCC) from the ascertained EA; and searching, by the one or more processors, for a match of the EAHash and a CCC of the ascertained EA to an EAHash and a CCC, respectively, of an instruction whose EAHash, CCC, and set are stored in an instruction history stream, wherein if the match is found from said searching, then the stored set of the match is referred to as an inferred set which is indicative of a read enable of only one class of one address group, and the one or more processors activate only read enables associated with the inferred set which indicates the read enable of the only one class of the one address group in the cache; and wherein if the match is not found from said searching, then activating, by the one or more processors, all read enables of the one address group in the cache.

2. The method of claim 1, wherein C is at least 2, wherein the match is found from the search, and wherein said activating only read enables associated with the inferred set comprises:

inferring a class associated with the inferred set;

address decoding the relaunched instruction to determine the G address groups;

logically combining the inferred class and the classes of the determined G address groups to identify the one class of the one address group in the cache; and activating the read enable of only the one class of the one address group in the cache.

3. The method of claim 2, wherein said logically combining is implemented via use of multiple AND gates comprising one AND gate for each class of each address group.

4. The method of claim 1, wherein each class of each address group includes at least one SRAM having global bit lines, wherein each class of each address group includes at least 2 subclasses, and wherein the method further comprises prior to execution of a read of the cache at the inferred set:

identifying, by the one or more processors, a subclass of the one class of the one address group such that the subclass includes the inferred set; and precharging, by the one or more processors, only global bit lines associated with the identified subclass.

5. The method of claim 4, wherein C=2, wherein the C classes consist of a class of even numbered sets and a class of odd numbered sets, wherein the inferred set consists of a least significant bit and remaining upper bits, wherein said inferring the class of the inferred set utilizes the least significant bit, and wherein said identifying the subclass of the one class of the one address group utilizes the remaining upper bits.

6. The method of claim 1, wherein the instruction history stream is a dynamically changing data buffer of constant depth K that stores an array of data for each processed instruction of K previously processed instructions, wherein the arrays of data are sequentially ordered in the buffer according to a latest time of entry into the buffer of the processed instructions such that each new processed instruction entering the buffer results in the instruction having the earliest time of entry into the buffer being dropped out of the buffer, wherein each stored array includes an EAHash, CCC, and predicted set (SETP) determined set of a respective processed instruction that entered the buffer, and wherein K is at least 2.

7. The method of claim 6, wherein K is in a range of 3 to 5.

8. The method of claim 6, wherein each stored array further includes a valid bit (V) selected from the group consisting of 1 or 0 denoting that the processed instruction is valid or invalid, respectively, and wherein the valid bit is set to 1 for each processed instruction entering the buffer.

9. The method of claim 8, wherein in response to a determination that a CCC and a SETP determined set of a cache write instruction respectively matches a CCC and a SETP determined set in one stored array in the buffer and that the valid bit of the one stored array is 1, setting the valid bit to 0 for the one stored array.

10. The method of claim 6, wherein an invalid SETP determined set in an array of one instruction in the instruction history stream is indicative of a SETPmiss due to the one instruction having attempted to read non-existent data from a cache line in the cache at the invalid SETP determined set.

11. The method of claim 6, wherein said searching results in a multihit SETP determined set match due to a hit on two different set values.

12. The method of claim 1, wherein said relaunching comprises relaunching the cache read instruction from a load launch queue that includes the ascertained EA.

13. The method of claim 1, wherein the match is not found from the search.

14. The method of claim 1, wherein the match is found from the search, and wherein the method further comprises:

obtaining, by the one or more processors, an actual set of the relaunched instruction from a predicted set (SETP) array; and determining, by the one or more processors, that the inferred set is not equal to the actual set so that data read from the cache is incorrect and cannot be used and in response, performing, by the one or more processors, an auto-correct process that mitigates incorrect data having been read from the cache.

15. A computer program product, comprising one or more computer readable hardware storage devices having computer readable program code stored therein, said program code containing instructions executable by one or more processors of a computer system to implement a computer-implemented method for reading data stored in a set associative cache, said method comprising:

relaunching, by the one or more processors, a cache read instruction that did not read the set associative cache after being previously launched, wherein an effective address (EA) of the instruction was ascertained prior to said relaunching and after the instruction was previously launched, wherein the set associative cache comprises G address groups encompassing all of the cache's stored data, wherein each address group comprises S sets and C classes, wherein S mod C=0 and each class comprises S/C sets, wherein each class has a read enable, and wherein G is at least 1, S is at least 2, and C is at least 1;

determining, by the one or more processors, a hash of the ascertained EA (EAHash) and a cache congruence class (CCC) from the ascertained EA;

searching, by the one or more processors, for a match of the EAHash and a CCC of the ascertained EA to an EAHash and a CCC, respectively, of an instruction whose EAHash, CCC, and set are stored in an instruction history stream, wherein if the match is found from said searching, then the stored set of the match is referred to as an inferred set which is indicative of a read enable of only one class of one address group, and the one or more processors activate only read enables associated with the inferred set which indicates the read enable of the only one class of the one address group in the cache; and wherein if the match is not found from said searching, then activating, by the one or more processors, all read enables of the one address group in the cache.

16. The computer program product of claim 15, wherein C is at least 2, and wherein the match is found from the search, and wherein said activating only read enables associated with the inferred set comprises:

inferring a class associated with the inferred set;

address decoding the relaunched instruction to determine the G address groups;

logically combining the inferred class and the classes of the determined G address groups to identify the one class of the one address group in the cache; and activating the read enable of only the one class of the one address group in the cache.

17. The computer program product of claim 15, wherein each class of each address group includes at least one SRAM having global bit lines, wherein each class of each address group includes at least 2 subclasses, and wherein the method further comprises prior to execution of a read of the cache at the inferred set:

identifying, by the one or more processors, a subclass of the one class of the one address group such that the subclass includes the inferred set; and precharging, by the one or more processors, only global bit lines associated with the identified subclass.

18. A computer system, comprising one or more processors, one or more memories, and one or more computer readable hardware storage devices, said one or more hardware storage devices containing program code executable by the one or more processors via the one or more memories to implement a computer-implemented method for reading data stored in a set associative cache, said method comprising:

relaunching, by the one or more processors, a cache read instruction that did not read the set associative cache after being previously launched, wherein an effective address (EA) of the instruction was ascertained prior to said relaunching and after the instruction was previously launched, wherein the set associative cache comprises G address groups encompassing all of the cache's stored data, wherein each address group comprises S sets and C classes, wherein S mod C=0 and each class comprises S/C sets, wherein each class has a read enable, and wherein G is at least 1, S is at least 2, and C is at least 1;

determining, by the one or more processors, a hash of the ascertained EA (EAHash) and a cache congruence class (CCC) from the ascertained EA;

searching, by the one or more processors, for a match of the EAHash and a CCC of the ascertained EA to an EAHash and a CCC, respectively, of an instruction whose EAHash, CCC, and set are stored in an instruction history stream, wherein if the match is found from said searching, then the stored set of the match is referred to as an inferred set which is indicative of a read enable of only one class of one address group, and the one or more processors activate only read enables associated with the inferred set which indicates the read enable of the only one class of the one address group in the cache; and wherein if the match is not found from said searching, then activating, by the one or more processors, all read enables of the one address group in the cache.

19. The computer system of claim 18, wherein C is at least 2, and wherein the match is found from the search, and wherein said activating only read enables associated with the inferred set comprises:

inferring a class associated with the inferred set;

address decoding the relaunched instruction to determine the G address groups;

logically combining the inferred class and the classes of the determined G address groups to identify the one class of the one address group in the cache; and activating the read enable of only the one class of the one address group in the cache.

20. The computer system of claim 18, wherein each class of each address group includes at least one SRAM having global bit lines, wherein each class of each address group includes at least 2 subclasses, and wherein the method further comprises prior to execution of a read of the cache at the inferred set:

identifying, by the one or more processors, a subclass of the one class of the one address group such that the subclass includes the inferred set; and precharging, by the one or more processors, only global bit lines associated with the identified subclass.

* * * * *